United States Patent [19]

Weber et al.

[11] 4,143,528

[45] Mar. 13, 1979

[54] ANTI-THEFT LOCKING DEVICES

[75] Inventors: Günter Weber, Wuppertal; Günter Schaumburg, Radevormwald, both of Fed. Rep. of Germany

[73] Assignee: Neiman S.A., Courbevoie, France

[21] Appl. No.: 836,824

[22] Filed: Sep. 26, 1977

[30] Foreign Application Priority Data

Oct. 1, 1976 [DE] Fed. Rep. of Germany ....... 2644312

[51] Int. Cl.² ........................ E05B 15/00; E05B 63/00
[52] U.S. Cl. ...................................................... 70/1.5
[58] Field of Search .................. 70/1.5, 333, 416, 422; 109/30

[56] References Cited

U.S. PATENT DOCUMENTS

| | | | |
|---|---|---|---|
| 1,398,642 | 11/1921 | Lewis | 70/1.5 |
| 1,525,354 | 2/1925 | Anakin | 70/1.5 |
| 1,620,775 | 3/1927 | Meiliak | 70/1.5 |
| 2,228,971 | 1/1941 | Parkratz | 70/1.5 |
| 3,881,330 | 5/1975 | Hester | 70/1.5 |

Primary Examiner—Robert L. Wolfe
Attorney, Agent, or Firm—William Anthony Drucker

[57] ABSTRACT

The device serves to lock the locking bolt of a cylinder lock in its locking position when an unauthorized removal of the locking cylinder is effected. A lever mounted with the housing of the cylinder lock rests against a portion of the locking cylinder which effects swivelling of the lever upon the removal of the locking cylinder. The locking bolt is lockable by a locking piece which is spring-loaded in the direction of the locking position and is held in the unlocking position by the lever in the non-swivelled state thereof. The locking piece is released when the lever has been swivelled by the locking cylinder.

12 Claims, 3 Drawing Figures

ANTI-THEFT LOCKING DEVICES

BACKGROUND OF THE INVENTION

The invention relates to a device for locking the locking bolt of a cylinder lock in its locked position when an unauthorised removal of the lock cylinder is effected, which device comprises a lever which rests against a portion of the locking cylinder and which is swivelled upon the removal of the locking cylinder.

For the forced manipulation of cylinder locks, it is known practice to pull the locking cylinder therefrom and to press back the locking bolt through the opening which has then been formed. In order to prevent this happening, it is known to allow the locking cylinder to engage in the lock housing in an unreleasable manner ("buttoning-in"). Moreover, it is known from German Offenlegungsschrift No. 2,252,743 to prevent the locking bolt being pressed back in that there is arranged in the lock housing at the rearward end of the locking bolt a lever which rests against the cylinder core shift roller when the locking bolt locks and tilts, when the locking cylinder has been pulled out, to a position in which it prevents the locking bolt from being pressed back. Since this known lever is also moved during the cylinder core locking movements, it is relatively complicated and elaborate in design and therefore susceptible to trouble. Moreover, when the locking cylinder has been pulled out, this lever can also be manipulated in a manner similar to the locking bolt, and furthermore it is possible for the lever to be inadvertently moved to the locking position during the installation of the lock, thus making dismantling necessary.

It is the object of the invention to improve a device of the kind mentioned at the beginning in such a way that it is simple in construction, cannot be manipulated when the locking cylinder has been withdrawn and is easy to install.

SUMMARY OF THE INVENTION

According to the invention, this task is solved in that the locking bolt can be locked by means of a locking piece which is provided in addition to the lever and is spring-loaded in the direction of the locked position and is held in the unlocked position by the lever when this latter is not in its swivelled condition and is detached when the lever is swivelled.

On a cylinder lock provided with the device according to the invention, it is impossible to manipulate either the locking bolt or the locking means blocking the locking bolt, when the locking cylinder has been withdrawn. Since the device according to the invention works completely independently of the lock movements, fitting is simple and cannot cause an unintentional triggering of the device. Moreover, the device can be of very simple construction.

A particularly simple and reliable construction is provided in that the lever end opposite to the cylinder forms a surface or nose against which the locking piece face which can penetrate into the locking bolt rests in the cocked position.

In order to ensure with great reliability that the lever will not be moved to the unlocking position even when vibrations occur, it is proposed that the lever should be held in its non-swivelled position by a deformable or resilient part. The deformable part may be a bendable projection on the lever or the housing wall. For an easy deformability, this projection may comprise a predetermined breaking point. However, the projection may alternatively consist of a resilient material.

Preferably, it is proposed that the deformable or resilient part arranged on the lever should be supported on an internal wall of the lock housing. A simple and space-saving construction is provided in that the locking piece is arranged between the locking bolt head and the locking cylinder or the shift roller thereof at right angles to the displacement path of the locking bolt.

A manipulation of the locking piece is particularly reliably prevented in that the lever lies between the locking piece and the locking cylinder or the shift roller thereof in a lock housing recess closely surrounding the lever. A disc-like design of the lever not only produces a high stability of the lever but also prevents, in addition, any penetration of tools in the direction of the locking piece. The side surfaces of the lever may be parallel to a plane extending through the locking cylinder axis and the locking bolt axis or the locking bolt movement axis and the lever hinge axis may be vertical to the side surfaces.

For the actuation of the lever, the shift roller, which is coaxially arranged on the cylinder core, may comprise a radial projection between the end of the lever and the locking bolt. This projection may be arranged at a point of the shift roller which points towards the lever when the locking bolt locks, so that the lever is reliably actuated by the withdrawal of the locking cylinder.

When an axially displaceable cylinder core is used in a cylinder lock, the axial extension of the surface between the projection and the cylinder lock and/or the shift roller parts which are of larger design in radial cross section may correspond to the displacement path.

BRIEF DESCRIPTION OF THE DRAWINGS

An exemplified embodiment of the invention is shown in the drawings and will be described in detail hereinafter. In the drawings.

DESCRIPTION OF PREFERRED EMBODIMENT

Figure 1:
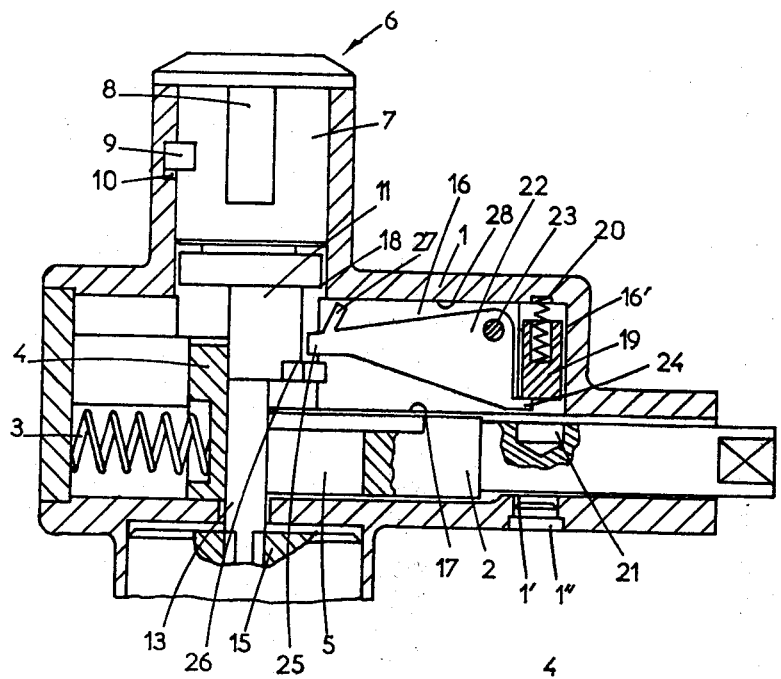
FIG. 1 shows a longitudinal section through a motor vehicle steering lock in its locked position after having been operated normally.
Figure 2:
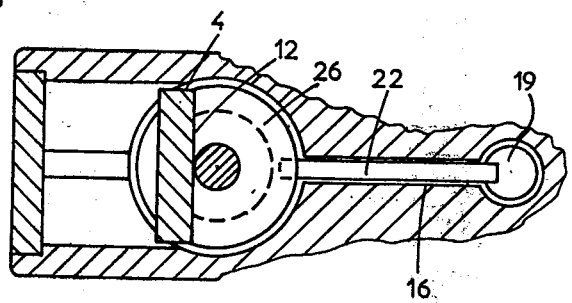
FIG. 2 shows a section along the line I—I shown in FIG. 1.

The steering lock comprises a reception housing 1 which is undetachably connected to the vehicle steering system. Displaceably mounted in the reception housing 1 is a locking bolt 2 which is acted on in the direction of the steering wheel shaft by a spring 3 which is supported on the reception housing. At the cylinder lock end, the locking bolt 2 is provided with a lug 4 and comprises a slot-shaped aperture 5 extending together with the longitudinal axis thereof. Arranged in the reception housing 1 is the cylinder lock 6, whose cylinder housing 7 is mounted in the reception housing 1 in a rotation-proof manner by means of an elevated wedge 8 and is secured against axial displacement by a detent 9 which positively engages in a groove 10 of the reception housing 1. The core of the cylinder lock 6, which is rotatable by means of a key, is coupled to a shift roller 11 which, when the lock is actuated, acts by means of a flat 12 on the lug 4 of the locking bolt 2 for the displacement thereof. The coaxial shaft 13 of the shift roller 11 penetrates the slot 5 of the locking bolt 2 and, during the continued course of its axial extension, positively engages in the rotatable portion of the ignition switch 15 so as to switch the operating electric circuits of the vehicle.

For the implementation of the position in readiness for locking, a locking means which is in direct or indirect operating connection with the cylinder lock key and which holds the locking bolt in the unlocked position in known manner until the key is partially or completely withdrawn from the cylinder lock, forms an integral part of the steering lock. This locking means is not shown in the drawings. In the reception housing 1, there is provided a recess 16 which adjoins the recesses for the locking bolt guide 17 and the reception aperture 18 for the shift roller. In the portion of the recess 16 at the steering shaft end, a lock-bolt-shaped cylindrical locking piece 19 is mounted in a recess 16' so that it can be moved in an axially parallel manner relative to the cylinder core and is acted on in the direction of the locking bolt 2 by a spring 20. The locking bolt 2 comprises a blind-hole-shaped depression 21 which is opposite to the locking piece 19 in the locked position. An installation hole 1' of corresponding size is coaxially associated with the locking piece 19 in the reception housing 1. Adjoining the locking piece 19 at the locking cylinder end in the recess 16 is a disc-shaped lever 22, whose side surfaces lie parallel to a plane extending through the locking cylinder axis and the locking bolt longitudinal axis and which is penetrated at right angles to the side surfaces by a pin 23, which is fixed on the housing, and which can be swivelled about this pin. At the locking bolt end, the lever 22 comprises a nose 24 which projects into the displacement path of the locking piece 19 between the locking piece and the locking bolt and retains the locking piece in the non-locking position. At the locking cylinder end, the lever 22 projects, with its end 25, into the axial displacement path of a projection 26 of the shift roller, when the steering lock is in the locked position, the end 25 being located between the projection 25 and the cylinder housing 7 and being moved away from the locking bolt when the cylinder housing, including the cylinder core and the shift roller 11, is withdrawn from the reception housing 1. For holding the locking piece 19 in the inoperative position, the lever 22 comprises on its front face that is remote from the locking bolt a pin-shaped projection 27 or cam which is arranged obliquely to the front face and is supported on the surface 28 of the recess 16 which is opposite to the front face. The cross section and shape of the projection 27 are such that it will only be deformed upon a loading of the lever 22 corresponding to the use of force and the lever 22 can be swivelled only by this means for the release of the locking piece 19. The force required for a deformation of the cam or projection 27, which is integral with the lever, can be determined by the selection of a resilient material of the lever or by the arrangement of a predetermined breaking point.

For the installation of the locking bolt blocking means, the spring 20 of the locking piece 19 is pushed through the installation hole 1' of the reception housing into the recess 16' adjoining the recess 16. The lever 22 is introduced through a locking bolt installation opening and is secured in the reception housing 1 by the pin 23. The installed locking bolt 2 causes the installation opening 1' in the reception housing 1 to be covered and prevents any action on the locking piece 19. The installation opening 1' is additionally shut by the plug 1'. For the installation of the cylinder lock 6, the rotatable cylinder core and the shift roller 11 are rotated in the clockwise sense by means of the key to such an extent that the projection 26 of the shift roller 11 can be guided past the end 25 of the lever 22. During this process, the locking bolt is moved in the reverse direction in known manner. On steering lock constructions which are secured to the vehicle steering unit in a pre-assembled state and to which the cylinder lock is added later by "buttoning-in", the detent 9 of the cylinder housing 8 can, for security reasons, only be moved in known manner to the "buttoned-in" position in a cylinder core position rotated in the clockwise sense by means of the key. In accordance with this position, the shift roller 11 is inserted in the pre-assembled steering lock and is positively connected in the rotary and axial directions in known 'per se' manner to the rotatable cylinder core and/or parts of the cylinder housing by clipping, bayonet fixing or the like.

The afore-described embodiments for the installation of the steering lock reveal that a necessary dismantling of the cylinder lock can be effected when the associated key is present without releasing the additional blocking means and thus making the steering lock unfit for use.

Figure 3:
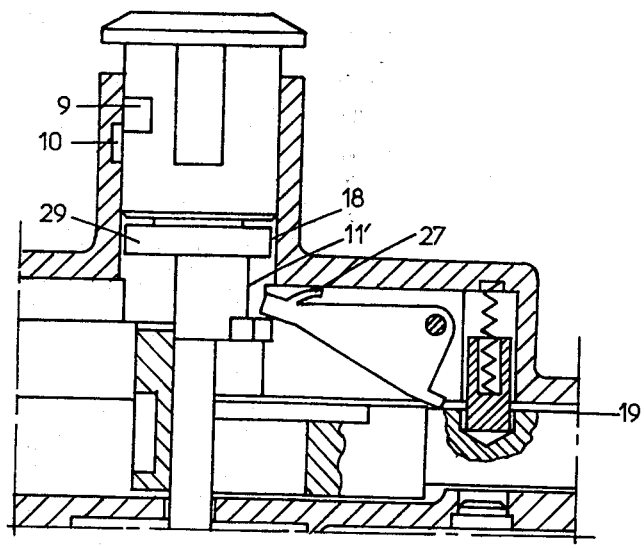
FIG. 3 shows a longitudinal section according to FIG. 1 showing the locking piece blocking the locking bolt and the partially axially displaced cylinder lock.

FIG. 3 shows how, upon an axial displacement of the cylinder lock from the locking position, the projection 26 of the shift roller 11 acts on the end 25 of the lever and swivels the lever 16 after the deformation of the projection or cam 27, causing the nose 24 to release the locking piece 19, so that the locking piece is pressed into the depression 21 of the locking bolt 2 by the spring 20. The locking piece 19 lying in the depression 21 of the locking bolt and partially in the reception housing 1 blocks the locking bolt in both directions of movement. This locking position can only be cancelled by the complete destruction or the dismantling of the locking means.

We claim:

1. A device for locking the locking bolt of a cylinder lock in its locked position when an unauthorised removal of the locking cylinder is effected, comprising
   (a) a lever which rests against a portion of the locking cylinder and which is movable from a first to a second position upon the removal of the locking cylinder;
   (b) a locking piece movable between an unlocking and locking position in engagement with an aperture formed in said locking bolt and
   (c) spring means for urging said locking piece in the direction of the locking position, said locking piece being held in a cocked state in the unlocking position by the lever in one position thereof with the leading face of same locking piece resting against a surface at the end of the lever that is opposite to the cylinder lock and being released when the lever has been moved by said locking cylinder to the second position.

2. A device according to claim 1 wherein the lever is held in its first position by a deformable part.

3. A device according to claim 2, wherein the deformable part is a bendable projection on the lever.

4. A device according to claim 3, wherein for easier deformability the projection comprises a predetermined breaking point (weakened region).

5. A device according to claim 3, wherein the projection consists of a resilient material.

6. A device according to claim 2 wherein the deformable part arranged on the lever is supported on an internal wall of a housing of the cylinder lock.

7. A device according to claim 1, wherein the locking piece is arranged between the locking bolt head and the locking cylinder at right angles to the displacement path of the locking bolt.

8. A device according to claim 1 wherein the lever lies between the locking piece and the locking cylinder thereof in a recess formed in a housing of the cylinder lock closely surrounding the lever.

9. A device according to claim 1 wherein the lever is plate-shaped, its side faces lie parallel to a plane extending through the locking cylinder axis and the locking bolt axis, the lever hinge axis being arranged vertically to the side faces.

10. A device according to claim 1, wherein a shifting roller, which is coaxially arranged on the cylinder core, comprises between the end of the lever and the locking bolt a radial projection for the actuation of the lever.

11. A device according to claim 10, wherein the projection is arranged at a point of the shifting roller which points towards the lever when the locking bolt is in its locking position.

12. A device according to claim 10, wherein when axially displaceable cylinder cores are used, the axial extension of the surface between the projection and the cylinder lock which are larger in radial cross section corresponds to the displacement path.

* * * * *